United States Patent [19]

Platus

[11] Patent Number: 5,370,352

[45] Date of Patent: * Dec. 6, 1994

[54] DAMPED VIBRATION ISOLATION SYSTEM

[75] Inventor: David L. Platus, Los Angeles, Calif.

[73] Assignee: MINUS K Technology, Inc., Inglewood, Calif.

[*] Notice: The portion of the term of this patent subsequent to May 16, 2011 has been disclaimed.

[21] Appl. No.: 92,289

[22] Filed: Jul. 16, 1993

Related U.S. Application Data

[63] Continuation of Ser. No. 681,808, Apr. 8, 1991, abandoned, which is a continuation-in-part of Ser. No. 395,093, Aug. 16, 1989, abandoned.

[51] Int. Cl.⁵ ............................................ F16M 13/00
[52] U.S. Cl. ................................... 248/619; 248/638
[58] Field of Search .............. 248/603, 604, 619, 620, 248/593, 562, 632, 621, 638

[56] References Cited

U.S. PATENT DOCUMENTS

| | | | |
|---|---|---|---|
| 1,545,540 | 7/1925 | Wills | 248/619 |
| 2,313,893 | 3/1943 | Rushing | 248/619 X |
| 2,572,919 | 10/1951 | French et al. | 248/619 X |
| 2,932,482 | 5/1958 | Dickie | 248/619 |
| 3,028,138 | 4/1962 | Wells | 248/619 |
| 3,223,400 | 12/1965 | Deister, Jr. | 248/619 X |
| 3,606,704 | 9/1971 | Denton | 248/619 X |
| 3,727,865 | 4/1973 | Melrose et al. | 248/632 |
| 3,794,277 | 2/1974 | Smedley et al. | 248/619 X |
| 4,355,469 | 10/1982 | Nevis et al. | 248/604 X |
| 4,372,520 | 2/1983 | Shutt | 248/604 |
| 4,778,037 | 10/1988 | Papadopoulos | 248/603 X |
| 4,933,238 | 6/1990 | Fukahori et al. | 248/621 X |
| 4,984,971 | 1/1991 | Bergeron | 248/621 X |
| 5,040,764 | 8/1991 | Dubois | 248/603 X |
| 5,178,357 | 1/1993 | Platus | 248/619 |

FOREIGN PATENT DOCUMENTS

| | | | |
|---|---|---|---|
| 58-28035 | 2/1983 | Japan | 248/620 |
| 0394969 | 7/1933 | United Kingdom | 248/620 |

*Primary Examiner*—Ramon O. Ramirez
*Attorney, Agent, or Firm*—Fulwider Patton Lee & Utecht

[57] ABSTRACT

An improved vibration isolation system utilizes a damped elastic structure loaded to approach a point of elastic instability to reduce the stiffness of the structure and to increase the damping. The system provides very low amplification at system resonant frequencies and effectively isolates at higher frequencies.

26 Claims, 7 Drawing Sheets

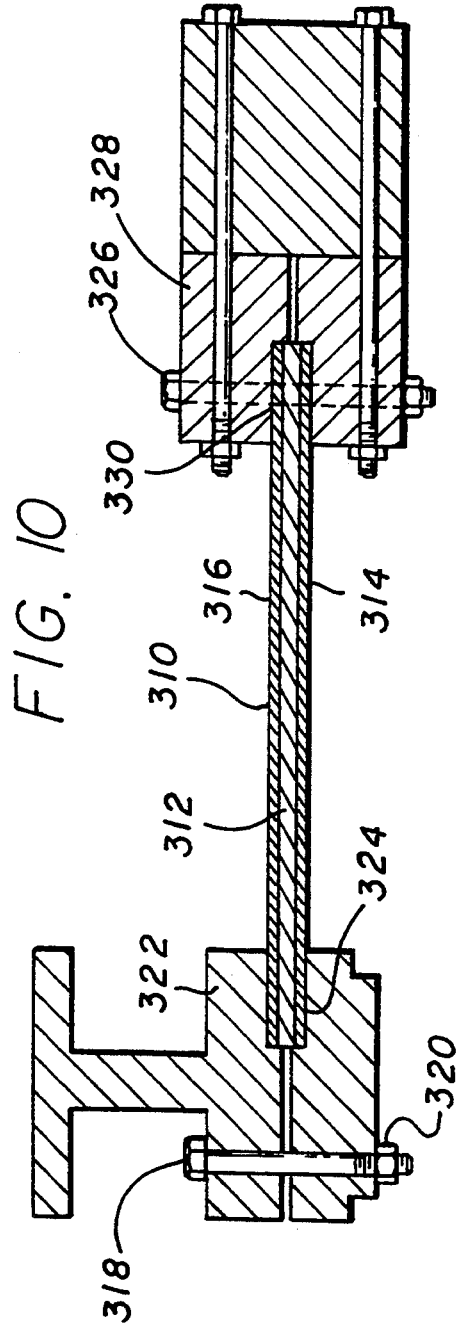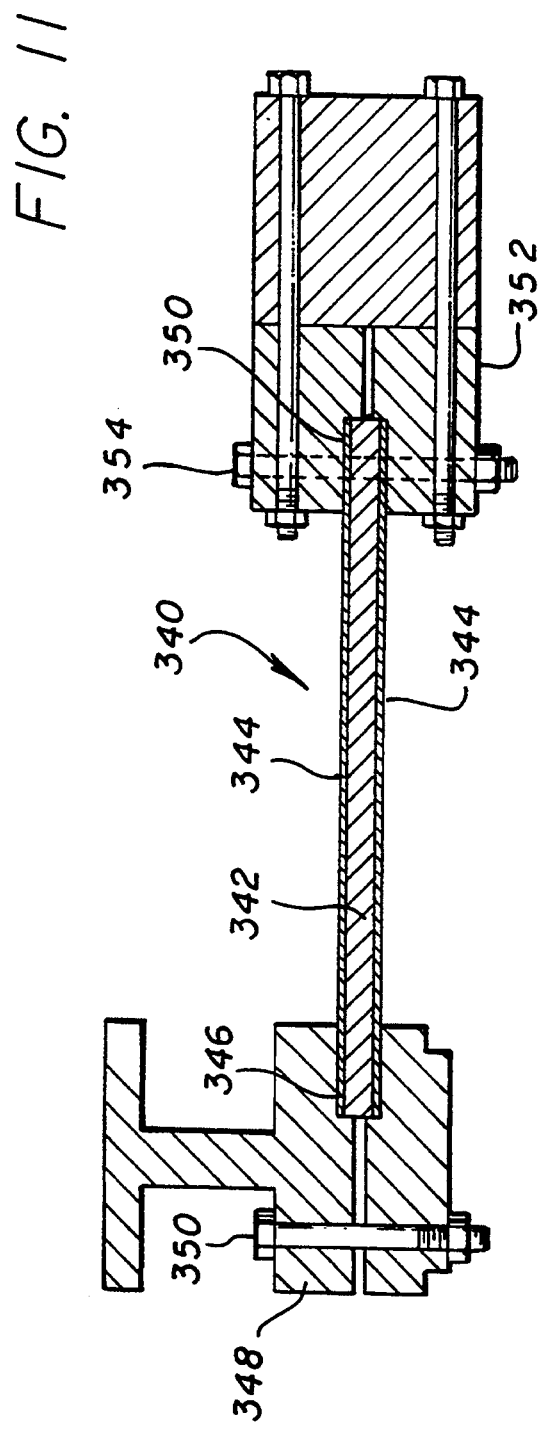

DAMPED VIBRATION ISOLATION SYSTEM

This application is a continuation of application Ser. No. 07/681,808, filed Apr. 8, 1991, now abandoned, which a continuation-in-part of co-pending application Ser. No. 395,093, filed Aug. 16, 1989, entitled "VIBRATION ISOLATION SYSTEM", now abandoned.

BACKGROUND OF THE INVENTION

1. Field of the Invention

This invention relates generally to suspension systems and methods for isolating or reducing the transmission of vibratory motion between an object and a base and, more particularly, to a damped vibration isolation or suspension system that exhibits low stiffness to effectively reduce the transmission of omnidirectional vibratory motion and further includes improved damping to effectively limited resonant responses of the system to values as low as or lower than those of critically damped, viscously damped systems while still providing effective isolation at higher frequencies. In some forms and applications of the present invention, the system provides isolation, rather than amplification over a wide range of frequencies which include the resonant frequencies of the system. The present invention is also directed to the method of adding damping to a particular isolation system which relies on elastic structures loaded to approach their so-called point of elastic instability to create an overall system which can minimize resonant responses while still providing effective isolation at higher frequencies.

2. Description of Related Art

The problems caused by unwanted vibration on motion-sensitive equipment and devices have been widely researched and numerous solutions to prevent or reduce the transmission of vibratory motion have been proposed and developed. Many of the devices designed to reduce the transmission of unwanted vibration between an object and its surroundings, commonly called vibration isolators or suspension devices, have utilized various combinations of elements such as resilient pads made from a variety of materials, various types of mechanical springs, and pneumatic devices which help reduce the effects of vibration found near the object to be isolated. There are, however, serious shortcomings and disadvantages associated with these particular prior art isolation systems which prevent them from obtaining low system natural frequencies while providing high isolation performance at low as well as high frequencies.

These shortcomings and disadvantages were addressed through my development of a novel vibration isolation system described in my co-pending application Ser. No. 395,093, filed Aug. 16, 1989, entitled "VIBRATION ISOLATION SYSTEM" which is hereby incorporated by reference in this present application. The particular vibration isolation system described in my co-pending application and utilized in connection with the present invention provides versatile vibration isolation by exhibiting low stiffness in an axial direction (generally the direction of the payload weight) and any direction substantially transverse to the axial direction. The particular system utilizes a combination of isolators that can be connected together in series to provide omnidirectional isolation. Each isolator is designed to isolate either the axial or the transverse component of any vibratory motion to effectively isolate vibrations in all directions.

Each isolator relies on a principle of loading a particular elastic structure which forms the isolator or a portion of it (the loading being applied by either the weight of the object, the combined weight of the object and another isolator, or by an external loading mechanism) to approach the elastic structure's point of elastic instability. This point of elastic instability, also called the "critical buckling load" of the structure causes a substantial reduction of either the axial or transverse stiffness of the isolator to create zero or near zero stiffness in the axial and any transverse direction. The isolators still retain sufficient axial stiffness to support the payload weight; however, there will be little or no stiffness in both the axial or transverse directions. As a result, the isolators suppress the transmission of vibratory motion between an object and a base. The magnitude of the stiffness of each particular isolator depends upon how closely the point of instability is approached.

If the load on the isolator's elastic structure is greater than the critical buckling load, the excessive load will tend to propel the structure into its buckled shape, creating a "negative-stiffness" or "negative-spring-rate" mechanism. By combining a negative-stiffness mechanism with a positive spring, adjusted so that the positive stiffness of the isolator cancels or nearly cancels the negative stiffness, the resulting device can be placed at or near its point of elastic instability. The magnitude of the load causing the negative stiffness can be adjusted, creating an isolator that can be "fine tuned" to the particular stiffness desired. In subsequent discussions, this means for reducing the stiffness of the elastic structure of the isolator will be referred to as a stiffness-reducing mechanism or negative-stiffness mechanism.

One of the properties associated with my vibration isolation system is the system's ability to significantly increase the inherent damping within the structure (e.g., the support springs, the radial flexures and the column members) through the compressive loading of these structures to approach their point of elastic instability. This principle, referred to herein as the damping multiplication effect, occurs when stiffness is reduced within the structure by the negative-stiffness mechanism. This damping multiplication effect can transform a lightly damped structure into a highly damped structure simply by applying a sufficient amount of loading force to the elastic structure. While the structure and method for creating this damping multiplication effect were fully disclosed in my co-pending application, the damping multiplication effect was not fully recognized, and a full explanation of this effect will now be provided. First, a brief discussion of the effects of damping will be provided.

Damping in prior art vibration isolation systems is frequently described in terms of critical damping ratio or percent critical damping, which refers to systems with viscous damping, although the damping mechanism may not actually be viscous damping. Damping in the preferred embodiments of my isolation system more closely approximates hysteretic damping or structural damping and is described in terms of "loss factor". Hysteretic damping is generally superior to viscous damping in vibration isolation systems, particular those with high damping, because hysteretic damping can limited the isolation system resonant responses to low values and still provide low transmissibility at higher frequencies. High damping in viscously damped systems seriously degrades the isolation system performance at higher frequencies. FIG. 12 shows the effects of damping on the transmissibility versus frequency ratio for a hysteretically damped system. Also, for comparison, a transmissibility versus frequency ratio curve is shown in a dashed line in FIG. 12 for a viscously damped system that has the same resonant response as the hysteretically damped system with a loss factor of 1.0 (the viscous critical damping ratio is 0.5). A loss factor of 2.0 corresponds to critical damping (i.e., a critical damping ratio of 1.0 for a viscously damped system). The transmissibility at resonance for this case is approximately 1.12. Resonant responses this low and lower can be achieved with the present isolation system, as well as hysteretic-damping-type transmissibility versus frequency ratio behavior closely approximating that of FIG. 12.

The damping multiplication effect inherent in my vibration isolation system can be explained by the following principles. First, consider an isolation system as shown in FIGS. 1 and 2 herein in which the elastic structure connected between the object and the base has an initial stiffness $K_s$ and an initial loss factor $\eta_s$ prior to application of the stiffness-reducing mechanism. The loss factor can be expressed in terms of the ratio of the energy dissipated per cycle to the maximum elastic energy stored during the cycle, i.e.:

$$\eta_s = \frac{1}{2\pi} \frac{\text{(Energy Dissipated per cycle)}}{\text{(maximum energy stored during cycle)}} \quad (1)$$

Also, since:

$$\text{(maximum energy stored during cycle)} = \tfrac{1}{2} K_s \delta^2 \quad (2)$$

where $\delta$ is the amplitude of the system displacement, $$\eta_s = \frac{1}{2\pi} \frac{\text{(Energy dissipated per cycle)}}{\tfrac{1}{2} K_s \delta^2} \quad (3)$$

The loss factor $\eta$ for the system with reduced stiffness $K$ has the same form as Eqs. 1 and 3, i.e., $$\eta = \frac{1}{2\pi} \frac{\text{(Energy dissipated per cycle)}}{\left(\tfrac{1}{2} K \delta^2\right)} \quad (4)$$

As the net stiffness of the system is reduced by the stiffness-reducing mechanism, the maximum elastic energy stored in the system during the cycle, $\tfrac{1}{2} K \delta^2$ is reduced, but the energy dissipated in the system per cycle is not reduced. This energy dissipated is, according to Eq. 3, $$\text{(energy dissipated per cycle)} = \pi \eta_s K_s \delta^2 \quad (5)$$

With Eqs. 4 and 5, the loss factor for the reduced-stiffness system is:

$$\eta = \frac{1}{2\pi} \frac{(\pi \eta_s K_s \delta^2)}{\left(\tfrac{1}{2} K \delta^2\right)} = \frac{\eta_s K_s}{K} \quad (6)$$

Thus, the loss factor for the reduced stiffness system is equal to the initial loss factor for the unloaded elastic structure, multiplied by the ratio of the initial stiffness to the reduced stiffness. Since, with the stiffness-reducing mechanism, the system stiffness can be reduced significantly, large values of the damping multiplication factor $K_s/K$ can be achieved.

Damping inherent in a structure, typically referred to as structural damping, includes hysteretic damping in the structural material and, if the structure is a built-up structure such as two or more sections bolted together, joint friction or interface damping as well.

The damping multiplication effect can significantly increase the damping in an elastic structure, such as a high strength steel structure, which has a loss factor typically below 0.01 when unloaded. The damping can be increased a hundred fold and greater through the application of the compression forces that load the structure towards its point of elastic instability to produce a loss factor exceeding 1.0. Substantially higher damping can be produced if the elastic structure being loaded to approach its point of elastic instability has higher damping to begin with, such as a rubber spring.

Many of the applications of my vibration isolation system have input vibrations over a range of frequencies that include the resonant frequencies of the system. Often there is a need to limit the response of the payload at the resonant frequencies of the system and to even minimize the response while still providing effective isolation at higher frequencies. In some applications, the multiplication effect can sufficiently increase the damping inherent in my isolation system structure so that no further damping of the system is required. In other applications, additional damping is desirable.

Therefore, it is desirable to add damping to my vibration isolation system for applications requiring high damping in order to significantly limit or minimize the system's resonant responses. However, isolation at higher frequencies should not be significantly compromised when adding damping to my vibration isolation system. Further, the use of added damping should not degrade the system (or should degrade it as little as possible) regarding its other benefits such as resistance to adverse environments, limited performance variations with fluctuating temperatures and dimensional stability.

SUMMARY OF THE INVENTION

Briefly, and in general terms, the present invention provides a versatile damped vibration isolation system that exhibits low stiffness, both vertically and horizontally, to provide isolation of omnidirectional vibrations and further includes increased damping which limits the resonant response of the system to low values while still providing effective isolation at higher frequencies. This versatile isolation system with improved damping can limit the resonant responses to values as low as or lower than those of critically damped, viscously damped prior art systems and, in some particular embodiments and applications, can provide isolation rather than amplification of responses over a wide range of frequencies which include the system's resonant frequencies. This performance can be attained while still providing effective isolation at higher frequencies.

In one preferred embodiment of the present invention, where very high damping is required, the vibration isolation system uses a combination of vertical-motion and horizontal-motion isolators with added damper assemblies connected in parallel with each isolator. The vertical-motion isolators support an object in a gravity field on an elastic structure such as a steel coil spring and utilize a negative-stiffness mechanism such as a set of radially compressed steel flexures to reduce the vertical stiffness. The horizontal-motion isolators are made from a number of vertical flexible columns which support the object weight and make use of a beam-column effect that acts as a negative-stiffness mechanism to reduce the initial horizontal stiffness of the unloaded column. The added damper assemblies cause a high damping material such as a polymeric rubber-like material to deform with operation of the vertical-motion and horizontal-motion isolators, thereby dissipating energy hysteretically and increasing the damping of the vibration isolation system.

In the preferred embodiments described herein, the damping in the high strength steel used to form the elastic structure is usually small compared with that of the high damping materials utilized in the damping assemblies and may be neglected for approximate analysis. In this case, prior to application of the negative stiffness mechanism, damping in the damped steel structure is less than that of the high damping material alone (the steel increases the energy stored but adds little to the energy dissipated). However, by proper design, damping in the isolation system can be made to exceed that of the high damping material alone. This can be explained by the following principles. The loss factor for the system with reduced stiffness is from Eq. 4 above, $$\eta = \frac{1}{2\pi} \frac{\text{(Energy dissipated in damper per cycle)}}{\frac{1}{2} K \delta^2} \quad (7)$$

The energy dissipated in the damper is, from equation 5, with the damper loss factor $\eta_D$ substituted for $\eta_s$ and the damper stiffness $K_D$ substituted for $K_s$, (energy dissipated in damper per cycle)$= \pi \eta_D K_D \delta^2$ \quad (8)

Eqs. 7 and 8 give:

$$\eta = \frac{1}{2\pi} \frac{(\pi \eta_D K_D \delta^2)}{\left(\frac{1}{2} K \delta^2\right)} = \frac{\eta_D K_D}{K} \quad (9)$$

Eq. 9 shows that the system loss factor is greater than that of the damper alone when K is less than $K_D$. The stiffness of the system prior to application of the negative stiffness mechanism is the sum of the stiffnesses of the damper and the steel structure $K_D$ and $K_s$. Thus, when K is less than $K_d$, the negative stiffness effect exceeds the stiffness $K_s$ of the steel structure. In the vertical-motion isolator, the negative stiffness effect from the radially compressed radial flexures exceeds the combined stiffness of the steel coil support spring and the steel radial flexures. In the horizontal-motion isolator, the negative stiffness effect from the beam column effect exceeds the horizontal stiffness of the loaded steel columns, i.e., the steel columns are unloaded above their critical buckling strength. Therefore, in the preferred embodiments, where very high damping is required that exceeds that of its high damping material, the isolation system acts as a compact suspension that supports an object in a gravity field on steel structures that resist creep, but the effective stiffness of the isolator is less than that of the high damping material and the system damping exceeds that of its high damping materials.

In one particular form of the vertical-motion isolator, the damper means or damper assembly is made up of two concentric steel tubes, one connected to the object and the other connected to the base, with a hollow cylindrical element of the damping material bonded to the tubes. Operation of the isolator causes the damper element to deform in shear. The damper assembly acts in parallel with the secondary support spring and the radial flexures and adds to the vertical stiffness of the vertical isolator. However, the isolator is assembled so that the damper element is unloaded in the equilibrium position of the isolator so that the damper element does not creep or otherwise react to the effects of stresses induced from supporting a weight load.

In one form of the horizontal-motion isolator, the damper means or assembly consists of a cylindrical damper element bonded at its ends to upper and lower plates, with the upper plate rigidly attached to an upper platform to which the ends of the column members are connected. The lower plate is rigidly attached to a support post rigidly connected to a base platform to which the lower ends of the column members are connected. Operation of the horizontal-motion isolator causes the damper element to deform in shear and adds to the damping and the stiffness of the horizontal-motion isolator. The isolator is assembled so that the damper element is unloaded when the isolator is at its equilibrium position so that it does not creep or otherwise react to the effects of stresses induced from the assembly loads. All of the weight load is carried by the column members which can include the weight of the object to be isolated from the unwanted vibrations along with the weight of a vertical-motion isolator, for example.

Another embodiment of the damper means in the horizontal-motion isolator utilizes a rigid thin walled tube that surrounds each steel rod column and is connected to the upper and lower platforms through short tubular damper elements of high damping polymeric rubber-like material. During operation of the isolator, relative horizontal translation of the upper and lower platforms (which are again connected by the columns) causes the tube to tilt and imposes a bending deformation on the damper elements.

In some particular embodiments, an arrangement of rigid elastic members connected to the upper and lower platform through flexible elements of a polymeric rubber-like material having stiffness and damping serves as the column members in the horizontal-motion isolation system and thereby eliminates the need for steel rod column members. In these embodiments, the column member acts as a beam column to support the weight load and to provide the reduced horizontal stiffness along with providing the desired damping effect. Likewise, a vertical-motion isolator can be made with a similar member that can serve as the radial flexure in the negative-stiffness mechanism. Such a composite member would provide the required negative-stiffness as well as the damping effect.

In some embodiments of the present invention in which polymeric rubber-like materials having viscoelastic properties are used with a zero or near-zero stiffness or negative-stiffness suspension system made from steel or other structural material, application of the system to low resonant frequencies (for example, approximately 1 Hertz) and very low amplitudes (for example, a few microinches) provides isolation rather than amplification over a range of frequencies that include the system resonant frequencies. At higher frequencies, the isolation behavior follows the expected roll-off behavior with increasing frequency ratio. To a first approximation, the polymeric rubber-like material behaves as a "dashpot" in series with a spring or as a "dashpot" in series with a damped spring. This behavior is evidenced by creep of the material under load. The isolation system thus behaves as a mass connected to the base through this material. At the low frequencies and very low amplitudes, the "dashpot" absorbs the base motion and the system does not resonate sufficiently to amplify the motion of the base (or to amplify the applied forces in the case of isolating a vibrating object from a base).

Still another embodiment of the present invention makes use of friction-interface damping to increase the initial structural damping inherent in the elastic structures which are loaded to approach their point of elastic instability. This permits the use of all metal construction or use of other structural materials to resist adverse environments such as high temperatures where the polymeric rubber-like high damping materials may not be suitable. The radial flexures could be made from multiple layered beams clamped at their ends so that operation of the isolator dissipates energy through mechanical friction between the layers and between the outer layers and the clamped surfaces. Similar multiple-layered and clamped-end constructions can be used to increase damping in the flexible column members for horizontal-motion isolators.

The present invention can include another embodiment which utilizes bimetallic construction for damping in isolation systems used to protect buildings and equipment from severe ground motions caused by earthquakes. The radial flexures of the vertical-motion isolators can be made with a high-strength core, such as a high-strength steel, with an outer layer of low-strength ductile metal, such as mild steel. Large ground motions from severe earthquakes would cause the outer layers of the radial flexures to exceed their yield points, thereby producing high hysteretic damping from cyclic plastic straining of the ductile metal. The all-metal construction is desirable for seismic isolation since the isolators can sit for many years with little or no maintenance and without degradation in their performance. Similar bimetallic construction can be used for the column members in a horizontal-motion isolator. Although straining of the outer layers beyond the yield point limits their fatigue life, the damping multiplication effect of the present invention can be utilized to provide a system with high damping and adequate fatigue life to withstand a "worst case" earthquake. If necessary, the bimetallic elements of the structure can be replaced when needed.

All in all, the present invention provides an improvement to the vibration isolation system described in my co-pending application by providing enhanced damping that can limit transmissibilities at the system resonant frequencies to values close to, or below 1.0 in some of the disclosed embodiments, and still provide effective isolation at higher frequencies. High damping can be provided by various mechanisms, some of which permit all metal construction or use of other structural materials suitable for adverse environments and long term use with little or no maintenance. The construction of the present invention also permits it to have a number of different uses. For instance, it can be utilized in the isolation of equipment associated with manufacturing of microelectronics and isolation of buildings and equipment subject to severe ground motion from earthquakes. Other applications of the present invention include vehicular suspension systems.

Other features and advantages of the present invention will become apparent from the following detailed description, when taken in conjunction with the accompanying drawings, which illustrate, by way of example, the principles of the present invention.

BRIEF DESCRIPTION OF THE DRAWINGS

FIG. 10 is a cross-sectional side view of a composite radial flexure having frictional damping;

FIG. 11 is a cross-sectional side view of another embodiment of a composite radial flexure with hysteretic damping from plastic straining of a ductile metal.

DETAILED DESCRIPTION OF THE PREFERRED EMBODIMENTS

Figure 1:
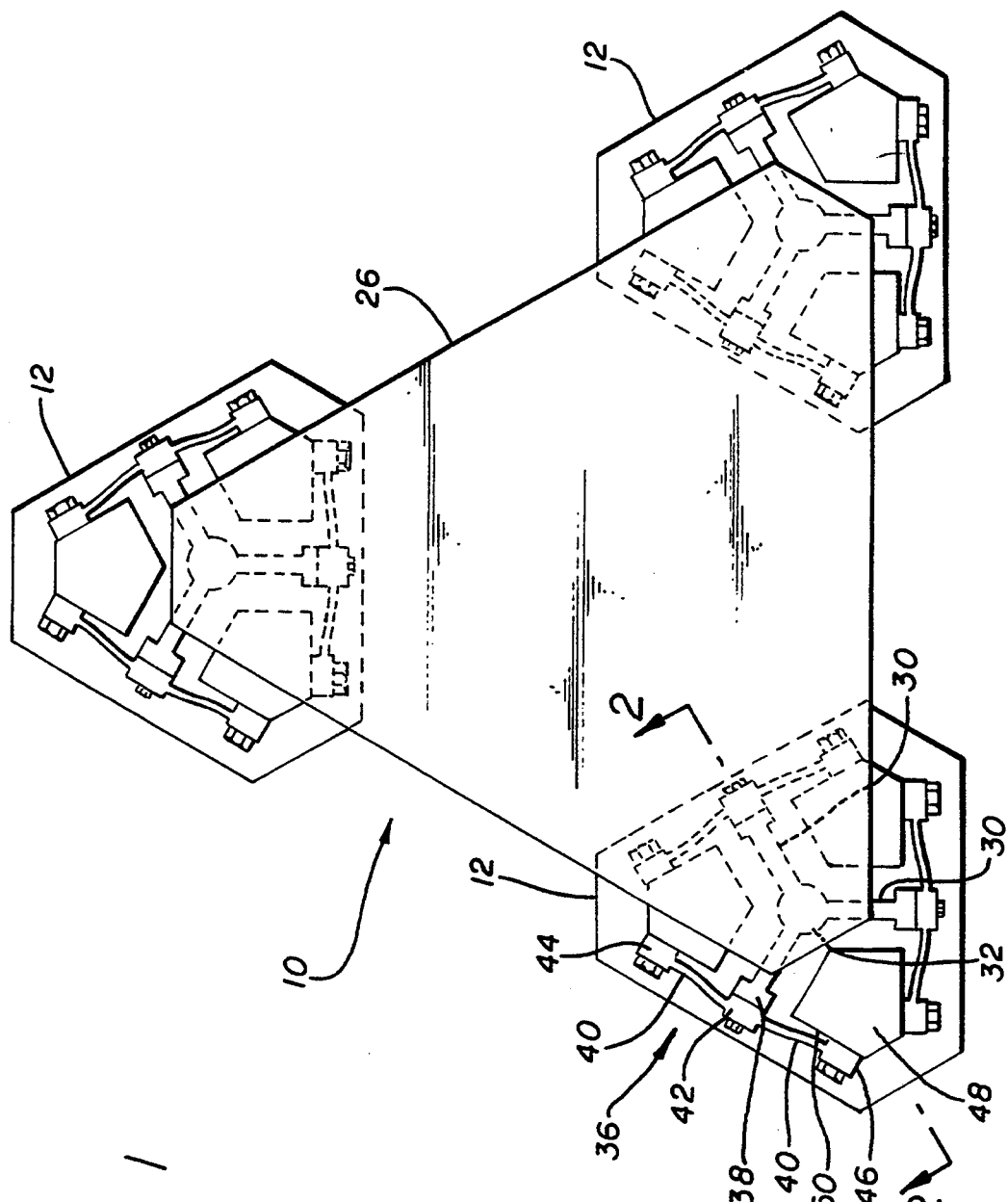
FIG. 1 is a plan view of one embodiment of a damped vibration isolation system made in accordance with the present invention.

As is shown in the drawings for the purpose of illustration, the present invention is embodied in a damped vibration isolation system that is capable of effectively isolating a motion-sensitive object from the effects of vibrations and other undesirable motions and which includes improved damping to limit the resonant responses of the system while still providing effective isolation at higher frequencies. The present invention is also directed to the individual vertical-motion and horizontal-motion isolators which includes means for providing damping to the isolators and the method for adding damping to an isolation system utilizing a negative-stiffness mechanism.

FIG. 1 shows one embodiment of a damped vibration isolation system 10 made in accordance with the present invention. The system 10 utilizes several novel vertical-motion isolation apparatus or isolators 12 that are used to resiliently support the object to be isolated. These vertical-motion isolators with their improved means for providing damping (discussed in greater deal below) provides one means for suppressing transmission of vibrations in a vertical direction and for providing damping in the vertical direction. These vertical-motion isolators operate by utilizing a spring means that supports the payload weight and a mechanism capable of producing negative stiffness that counteracts the positive stiffness of the spring means. As a result, a low net stiffness (approaching zero) may be achieved.

Figure 2:
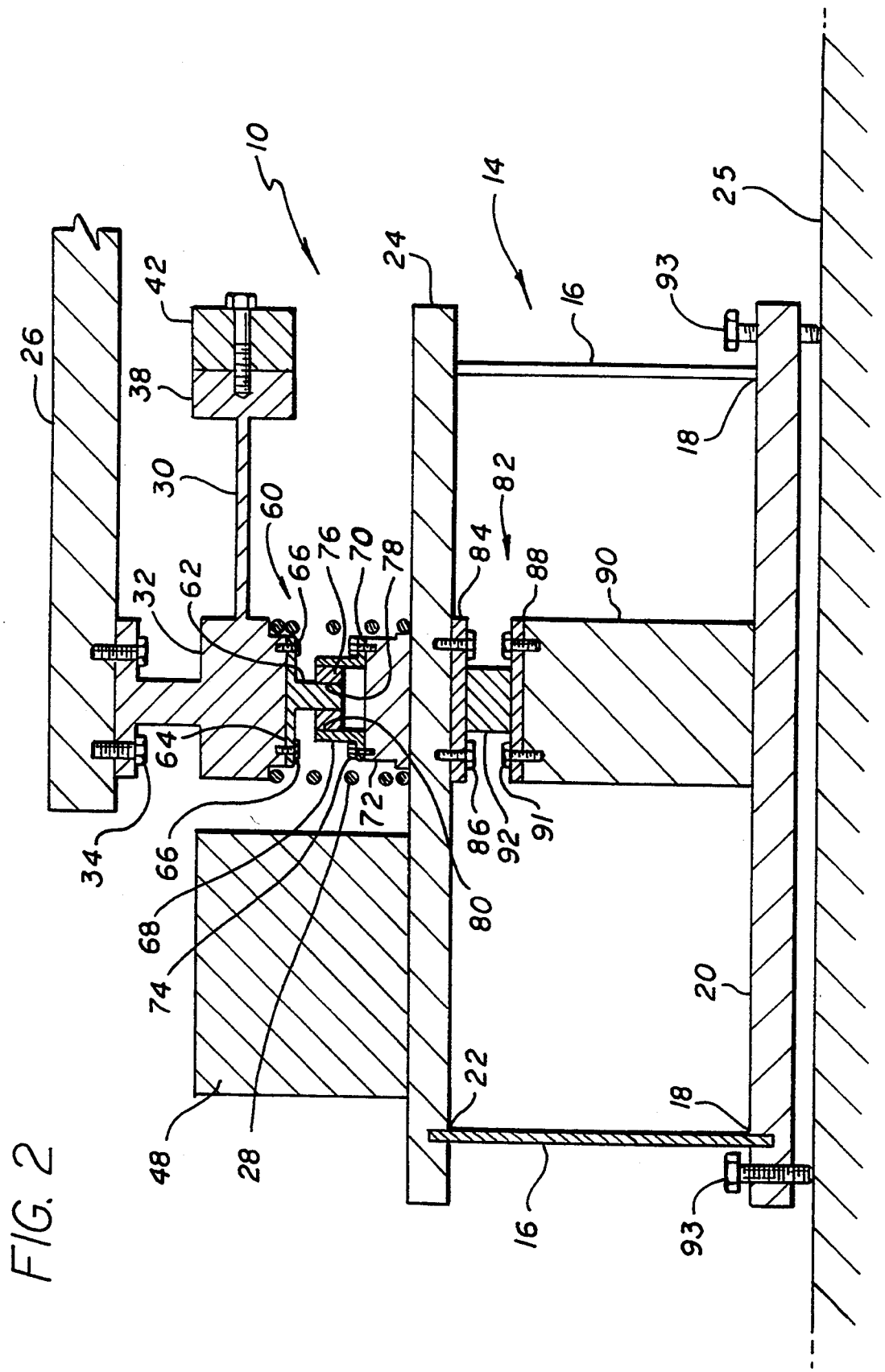
FIG. 2 is a cross-sectional side view of the embodiment shown in FIG. 1 taken along line 2—2.

The system 10 combines the vertical motion isolators 12 with one example of a horizontal-motion isolator 14 that includes at least three column members 16 (only two of which are shown in FIG. 2) that provide relatively stiff support in the vertical direction and resilient support in any horizontal direction. Each column member 16 is rigidly attached at its lower end 18 to a base platform 20. The upper end 22 of each column member 16 is also rigidly attached to its payload which may consist of a portion of the weight of the object to be isolated along with the weight of the vertical isolator. In FIG. 2, the upper end 22 of each column member is shown attached to the base 24 of the vertical-motion isolator. Each column member 16 can undergo a specific condition of unstable equilibrium when a certain vertical load is applied to the member. The critical value of this load is called the critical buckling load of the member or the point of elastic instability. Once this load is imparted to the column member, any additional load would cause the member to begin to buckle or deform into its buckled or instability mode shape.

The objective of the design of this particular horizontal-motion isolator is to load each of the column members axially with a weight that approaches the critical buckling load of the member. The member will still be sufficiently sturdy to support the payload weight, but there will be little or no stiffness in any horizontal direction for any of these members. As a result, these members will suppress the transmission of horizontal vibrations between the payload and the base.

Each vertical-motion isolator 12 has a horizontal-motion isolator 14 connected in series to it as is shown in FIG. 2. Further, each isolator 12 is arranged to support a payload platform 26 which is utilized to hold the object which is to be isolated from the foundation 25.

Referring now to both FIGS. 1 and 2, one embodiment of the vertical-motion isolator 12 used in the system is described and illustrated. In this particular form, the vertical-motion isolator 12 includes a base platform 20 upon which a spring means 28 is mounted. This particular spring means 28 supports the weight load and provides a positive spring stiffness in the vertical direction. This spring means 28 is attached to the negative stiffness mechanism which is comprised of three radial flexures 30 that are attached to each other at a central hub 32. This hub 32 acts as a central point that supports the object to be isolated. In this particular arrangement, the central hub 32 is attached to the support structure, namely the payload platform 26, which supports the isolated object. Alternatively, the central hub can be attached directly to the object to be isolated. Bolts 34 or other similar fastening devices are utilized to attach the payload platform 26 securely onto the central hub 32.

These three radial flexures 30 are spatially arranged from each other in approximate 120° orientation. Each radial flexure acts as a beam-column having a high axial stiffness but sufficient bending flexibly to permit it to bend or "flex" when subjected to bending moments caused by vertical loads. This bending flexibility adds provides the positive vertical stiffness to that of the weight supporting spring means. The damper element (described below) also adds vertical stiffness.

Compressive forces applied to these radial flexures or beam-columns causes them to behave as a negative-stiffness mechanism to provide negative stiffness at the hub 32 in the vertical direction. At a critical value of the radial compressive forces, which corresponds to the critical buckling load of the structure of supporting spring and flexures or beam columns, and damper element, a point of elastic instability is produced. This point of elastic instability is also the point at which the negative vertical stiffness caused by the radial compressive force just cancels the positive vertical stiffness associated with deformations of the supporting spring radial flexures and the damper element. As a critical value of compressive radial force, or critical buckling load, is approached, the net vertical stiffness of the vertical motion isolator decreases until, at the critical point or point of elastic instability, the net vertical stiffness is zero. Thus, the vertical motion isolator can support weight load in its vertical or axial direction, and the net vertical stiffness can be adjusted to zero or near zero by adjusting the radial compressive forces on each radial flexure.

Each radial flexure 30 is connected to means for providing compressive radial force on the flexure. In the particular embodiment shown in FIGS. 1 and 2, these means are shown as three loading flexure assemblies 36, one of which is connected to the outer end 38 of each radial flexure 30. Each loading flexure has two flexures 40 connected between a thickened center piece 42 and two thickened ends 44 and 46 which are in turn mounted to spacer blocks 48 that are attached to the base platform. Each spacer block 48 has an outer face 50 that is used for mounting purposes. The spacer blocks 48 are shaped and oriented in the arrangement shown in FIG. 1 to form several passages to allow the radial flexures to be positioned and moved without hinderance. The ends of the loading flexure assemblies are connected to the spacer blocks by a bolt or other similar fastening means.

This arrangement is just one of the many ways in which the loading flexure assembly can be secured to the radial flexure. Other mounting arrangements will become apparent to those skilled in the art. In operation, each loading flexure assembly is designed to apply an inward radial force on the outer end of the radial flexure. This can be achieved by moving the ends of the loading flexure assembly towards the center hub. The bolts that hold the ends of the loading assemblies to the spacer blocks can be simply tightened or "backed off" to achieve the required amount of radial force required for each radial flexure.

Additional damping is provided for the vertical-motion isolator 12 by damping means such as the damping assembly 60 shown in FIG. 2 which is operatively connected to the isolator. The damping provided by this damper assembly is in addition to the structural damping inherent in the vertical motion isolator which includes hysteretic or material damping in the elastically deformable elements forming the isolator and any joint friction or interface damping. Generally, the inherent structural damping will be much less than the damping provided by the damping assembly 60.

The damper assembly 60 in the vertical-motion isolator includes an inner cylinder 62 with a flange 64 that is attached to the hub with bolts 66 or other similar fastening means. An outer cylindrical tube 68 with a flange 70 is similarly attached to a post 72 which is attached to the base platform 20 by bolts 74 or other fastening assemblies. A hollow cylindrical damper element 76, which is made from an appropriate damping material and has a general disc or washer shape construction, is bonded to the outside surface 78 of this inner cylinder 62. The outside cylindrical surface 80 of this damper element 76 is also bonded, or otherwise fixedly attached to the cylindrical tube 68. Operation of the vertical motion isolator causes the damper element 76 to deform cyclicly in shear, thereby dissipating energy through hysteresis.

The vertical-motion isolator 14 is assembled so that the payload weight is carried by the support spring 28, i.e., the damper element 76 is substantially unloaded in the equilibrium position of the isolator. This eliminates or minimizes changes in the equilibrium position with time due to creep of the damper element. The vertical stiffness of the isolator is the sum of the vertical stiffnesses of the support spring, the radial flexures and the damper element. When the support spring and the compressed radial flexures exhibit significant net positive stiffness, the damping of the vertical isolator is less than that of the damper material alone. This is due to the fact that the energy dissipated per cycle is essentially the energy dissipated in the damper element 76 while the maximum elastic energy stored during the cycle is the elastic energy stored in the support spring and the radial flexures in addition to the energy stored in the damper element. For some low frequencies of interest (e.g., less than one Hertz), the damping of the damper material alone will generally be less than that of a critically damped viscously-damped system (i.e., having a "loss factor" less than 2.0) even for high damping materials. Therefore, in order to produce isolator damping as high as or above equivalent critical damping, in order to reduce the resonant transmissibilities to values approximating 1.0, the stiffness of the isolator must be reduced to a stiffness less than that of the damper element alone. This is achieved by designing for sufficient compressive force on the radial flexures thereby producing sufficient negative stiffness effect to cancel more than the combined stiffnesses of the support spring and the radial flexures. The compressed radial flexures and the support spring thereby exhibit a net negative stiffness that subtracts from the stiffness of the damper element 76.

A variety of high damping polymeric rubber-like materials are available in the market and can be used for the damping element. Two examples are the ISODAMP C-1000 Series Thermoplastic, available from EAR Division, Cabot Corporation, Indianapolis, Ind. and described in Material Data Sheet MDS-19. Other suitable materials include the ISOLOSS HD Elastomers, available from the EAR Specialty Composites Corporation, Indianapolis, Ind. and described in the EAR Bulletin "Introducing ISOLOSS" and material data sheet MDS-56, ISOLOSS HD. These materials exhibit damping behavior over certain temperature and frequency ranges that more closely approximate hysteretic rather than viscous damping. Generally, the damping material will exhibit much higher damping and much lower stiffness than the structural materials that make up the other elastic elements in the vertical-motion or horizontal motion isolators.

The means for damping the horizontal-motion isolator 14 is shown in FIG. 2 as a damper assembly 82 which includes an upper plate 84 which is attached to the base platform 24 with bolts 86. A lower plate 88 is similarly attached to a post 90 which is in turn attached to the base platform 20. Bolts 91 or other similar fastening devices can be used to maintain the lower plate 88 on this post 90. A damper element 92 is bonded to the upper plate 84 and lower plate 88 by adhesive or other similar bonding medium. Leveling screws 93 are located on the base 20 for leveling purposes. The same considerations apply to the behavior and the selection of damping material used in the damper assembly 60 of the vertical motion isolator 12. Operation of the horizontal-motion isolator causes the damper element 92 to deform cyclicly in shear, thereby dissipating energy through hysteresis. The horizontal-motion isolator 14 is assembled so that the payload and the vertical motion isolator weight loads are carried by the three column members 16 which results in the damper element 92 being substantially unloaded in compression. This eliminates or minimizes changes with time in the weight loads acting on the column members due to creep of the damper element 92.

The horizontal stiffness of the isolator during operation is the sum of the stiffnesses of the column members 16 and the damper element 92. When the column members exhibit significant net positive horizontal stiffness, damping of the isolator is less than that of the damping material alone. This is due to the fact that energy dissipated per cycle is essentially the energy dissipated in the damper element 92 while the maximum elastic energy stored during the cycle is the elastic energy stored by the column members in addition to the elastic energy stored by the damper element 92. Generally, in order for the horizontal motion isolator to exhibit damping as high as or above equivalent critical damping, the stiffness of the isolator must be reduced to a stiffness less than that of the damper element alone. This is achieved by designing the column members to be loaded substantially above their critical buckling strengths by appropriate applied weight loads so that the resulting beam column effect causes the column member to exhibit negative horizontal stiffness that subtracts from the horizontal stiffness of the damper element 92.

It is not necessary for the isolation system to operate at stiffness values less than that of the damping material alone in order to provide very high damping since there are damping materials available with very high damping. Even if the damping is reduced somewhat from these values, the vibration isolation system can still provide very high damping. For the special case where the system stiffness equals that of the high damping material, the stiffness of the steel structure has been reduced to zero. In this case, the isolation system comprising the undamped steel structure acts as a zero stiffness suspension so that, with the damping, the isolation system in operation acts as if the object were suspended only by the damping material.

In some embodiments of the invention in which certain polymeric rubber-like materials having viscoelastic properties are used with the near zero stiffness or negative stiffness suspension system of steel or other structural material, application to low resonant frequencies (e.g., around 1 Hertz) and very low amplitudes (e.g., a few microinches) of the motion provides isolation rather than amplification over a range of frequencies that includes the vibration isolation system resonant frequencies, and at higher frequencies the isolation behavior follows the expected roll-off behavior with increasing frequency ratio. To a first approximation the polymeric rubber-like material behaves as a dashpot in series with a spring or as a dashpot in series with a damped spring. This behavior is evidenced by creep of the material under load. The isolation system behaves as a mass connected to a base through this material. At the low frequencies and very low amplitudes, the dashpot absorbs the base motion and the system does not resonate sufficiently to amplify the motion of the base.

Figure 3:
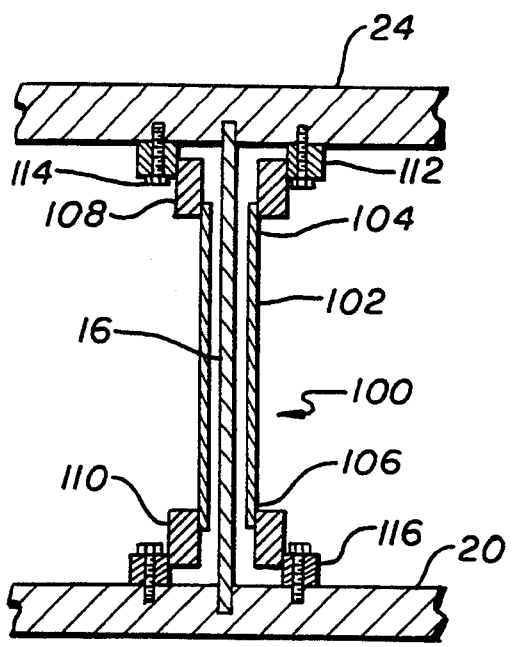
FIG. 3 is a cross-sectional side view of another embodiment of a horizontal-motion damper assembly.

FIGS. 3 to 6 show other embodiments of the damping means or column-damper assemblies that can be used in accordance with a horizontal-motion isolator. Referring initially to FIG. 3, an alternative damper assembly 100 is shown in a cross sectional side view as it surrounds a column member 16. Each of the column members in the horizontal-motion isolator would be surrounded by a similar damper assembly 100. This particular damper assembly includes a thin walled rigid tube 102 which includes an upper end 104 and lower end 106. The upper end 104 is inserted into and bonded to a short tubular damper element 108 and the lower end 106 is likewise inserted into and bonded to another short damper element 110. The particular damper element can be made from a high damping polymeric rubber-like material. The upper damping element 108 is partially inserted into and is bonded to an annular support block 112 which is attached to the platform 24 with bolts 114. Similarly, the lower damper element 110 is partially inserted into and is bonded to an annular lower support block 116 which is bolted or otherwise attached to the base platform 20. Operation of this particular isolator causes the rigid tube 102 to tilt relative to the base platform 24 and the base platform 20 which causes bending deformation of the damper elements 108 and 110 thereby dissipating energy thorough hysteresis. The horizontal-motion isolator is assembled so that the weight loads are carried by the column members 16 so that the damping elements 108 and 110 are substantially unloaded in compression. This eliminates or minimizes changes within time in the weight forces acting on the column member 16 due to creep of the damper elements.

Figure 5:
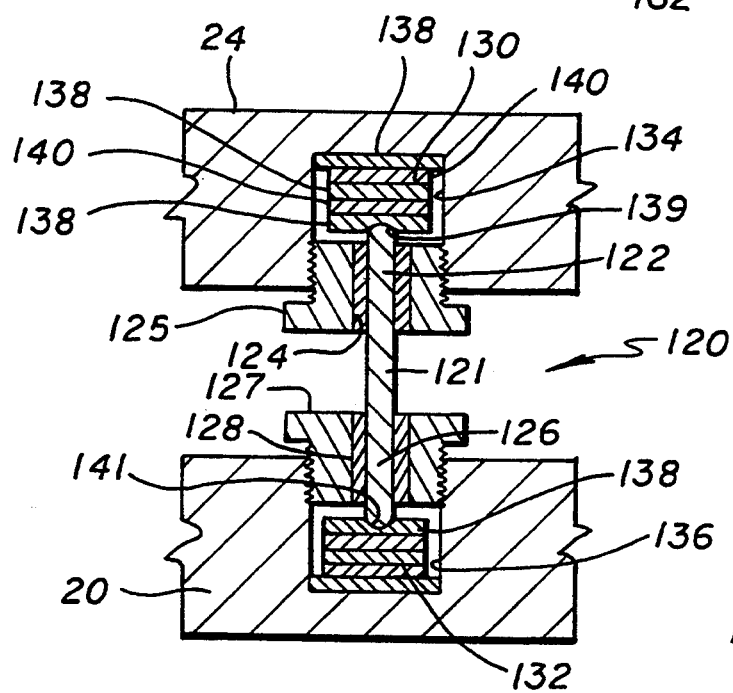
FIG. 5 is a cross-sectional side view of an embodiment of a horizontal-motion damper assembly.

Referring now to FIG. 5, another embodiment of a column-damper assembly 120 for use in horizontal-motion isolating systems is shown in a cross sectional side view. FIG. 5 shows a rigid rod 121 with spherical ends having an upper end section 122 passing through and bonded to an annular spring-damper element 124 and having a bottom end 126 passing through and bonded to a similar lower annular spring damper element 128. The rod 121 is supported axially on a pair of "bridge-bearing" type springs 130 and 132 located in openings 134 and 136 formed in the upper platform 24 and lower platform 20, respectively. Each of the annular spring damper elements 124 and 128 are contained in hollow plugs 125 and 127 that engage threaded portions of the openings 134 and 136 defined in the upper and lower platforms 20 and 24.

Each of these bridge-bearing-type springs comprise alternate layers of steel 138 and rubber-like material 140 such as neoprene which are bonded together to produce a stiff spring in the axial direction and a relatively soft spring in lateral shear. Shallow spherical cavities 139 and 141 are formed on the layers of steel 138 on each bridge-bearing-type spring. With the vertical weight load on the rod 121, relative horizontal motion of the platform causes the rod to tilt and also causes some lateral shear deformation of the bridge-bearing type springs which produces a negative-stiffness effect in the horizontal direction. This negative-stiffness effect counteracts the positive horizontal-stiffness that results from the annular spring damper elements and the bridge-bearing-type springs. The bridge-bearing-type springs in this embodiment also provide some damping to limit possible isolator resonances associated with the vibration of the mass associated with the upper intermediate platform vibrating on springs associated with axial stiffness of the column assembly. The arrangement of FIG. 5 permits large weight loads to be supported by the column assembly with little or no steady loads imposed on the spring-damper elements.

Figure 4:
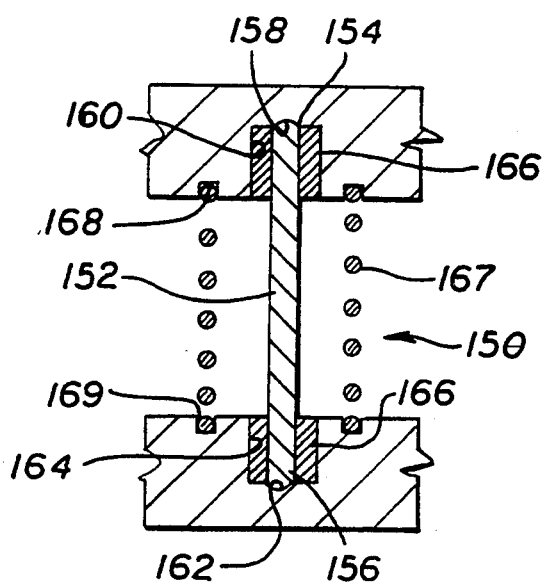
FIG. 4 is a cross-sectional side view of an alterative embodiment of a horizontal-motion damper assembly.

FIG. 4 shows another embodiment of a column damper assembly 150 in a horizontal-motion isolation system. This particular form of the invention utilizes a rigid rod 152 having an upper spherical end 154 and a lower spherical end 156. The upper spherical end 154 is positioned in a spherical cavity 158 defined in an opening 160 in the upper platform. Likewise, the lower end 156 of the rigid rod 152 is similarly situated in a spherical cavity 162 which is formed in an opening 164 in the lower base platform. This rigid rod 152 supports most of the weight load which would be placed on the upper platform 24. A polymeric rubber-like damping material 166 fills the annular spaces surrounding the ends of the column members and acts as the spring damper. A steel coil spring 167 connects between the upper and lower platforms. The upper end is captured in an annular opening 168 in the upper platform; the lower end is captured in annular opening 169 in the lower platform. This coil spring provides positive horizontal stiffness in response to relative horizontal displacement between the upper and lower platforms, but is very flexible in vertical direction compared with the rigid rod, and supports only a small part of the vertical weight load. With the weight loaded on the rod, tilting of the rod during operation of the isolator causes the negative-stiffness effect that counteracts the positive stiffness from the spring-damper material 166 and the coil spring 167. This arrangement permits the assembly to support larger weight loads with no steady loads on the spring-damper material.

With the steel coil spring, this system can be designed so that the net horizontal stiffness of the coil spring and the axially-loaded rod is positive so as to eliminate a possible creep instability associated with the negative stiffness mechanism and the damper spring alone. Similar steel springs or springs from other structural materials with dimensional stability can be added to the other horizontal-motion column-dampers in order to avoid this possible creep instability.

Figure 6:
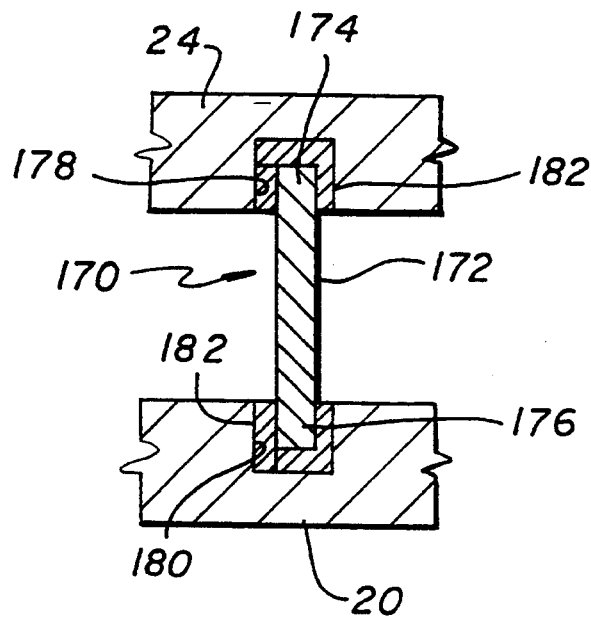
FIG. 6 is a cross-sectional side view of an embodiment of a horizontal-motion damper assembly.

A similar column damper assembly 170 is depicted in FIG. 6 which shows a rod 172 having an upper end 174 and lower end 176 disposed in openings 178 and 180 defined in the upper and lower platforms 20 and 24 respectively. A similar polymeric rubber-like damping material 182 fills the opening around the ends of the rod and acts as a spring-damper. This particular arrangement is a rather simple embodiment of the present invention and can have some uses when a simple construction of a column-damper is required and creep is not a problem.

Figure 7:
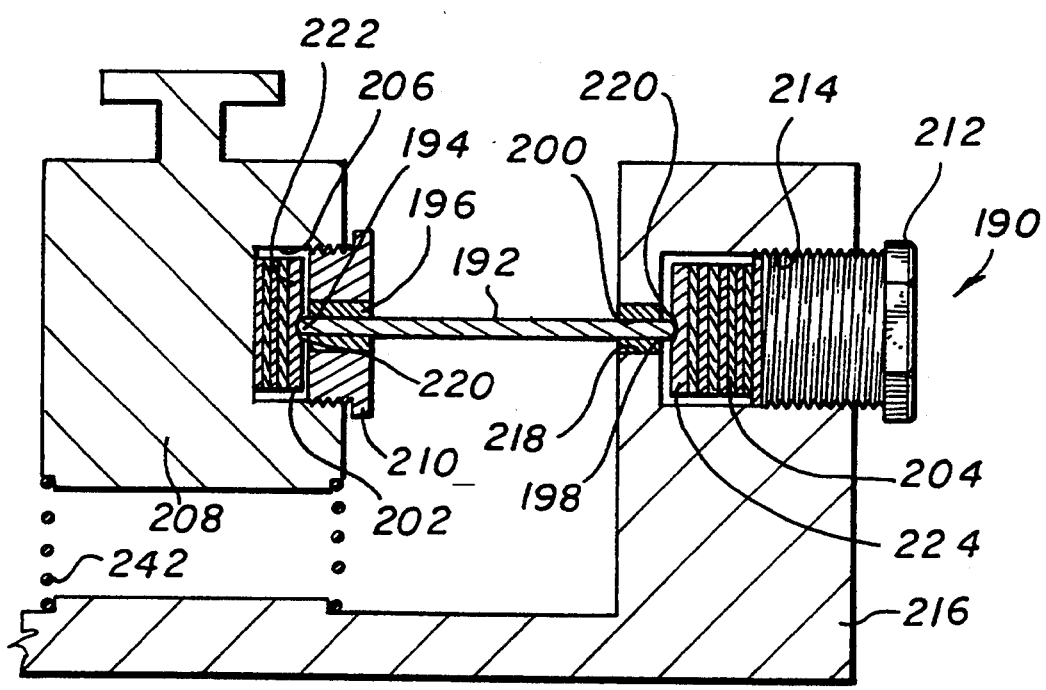
FIG. 7 is a partial cross-sectional side view of an embodiment of a vertical-motion damper assembly.
Figure 8:
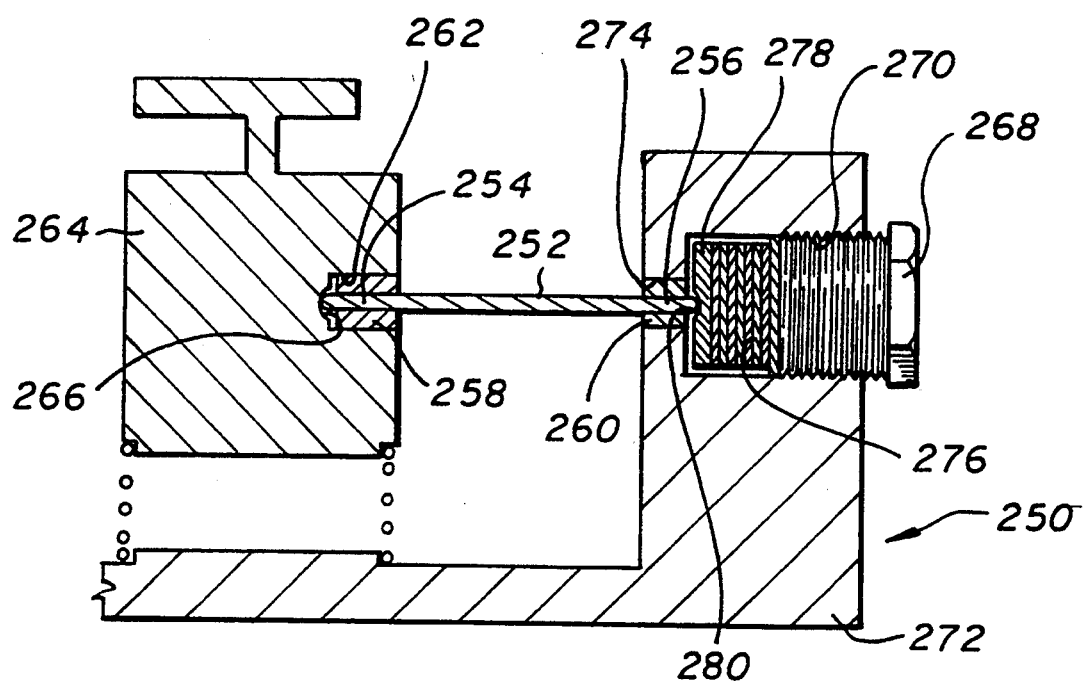
FIG. 8 is a partial cross-sectional side view of an embodiment of a vertical-motion damper assembly.
Figure 9:
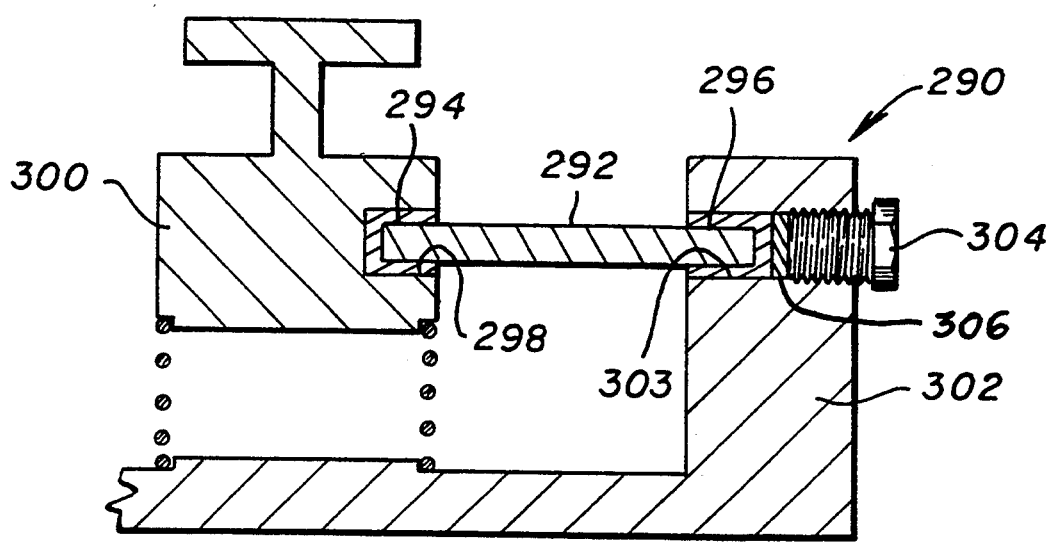
FIG. 9 is a partial cross-sectional side view of an embodiment of a vertical-motion damper assembly.
Figure 12:
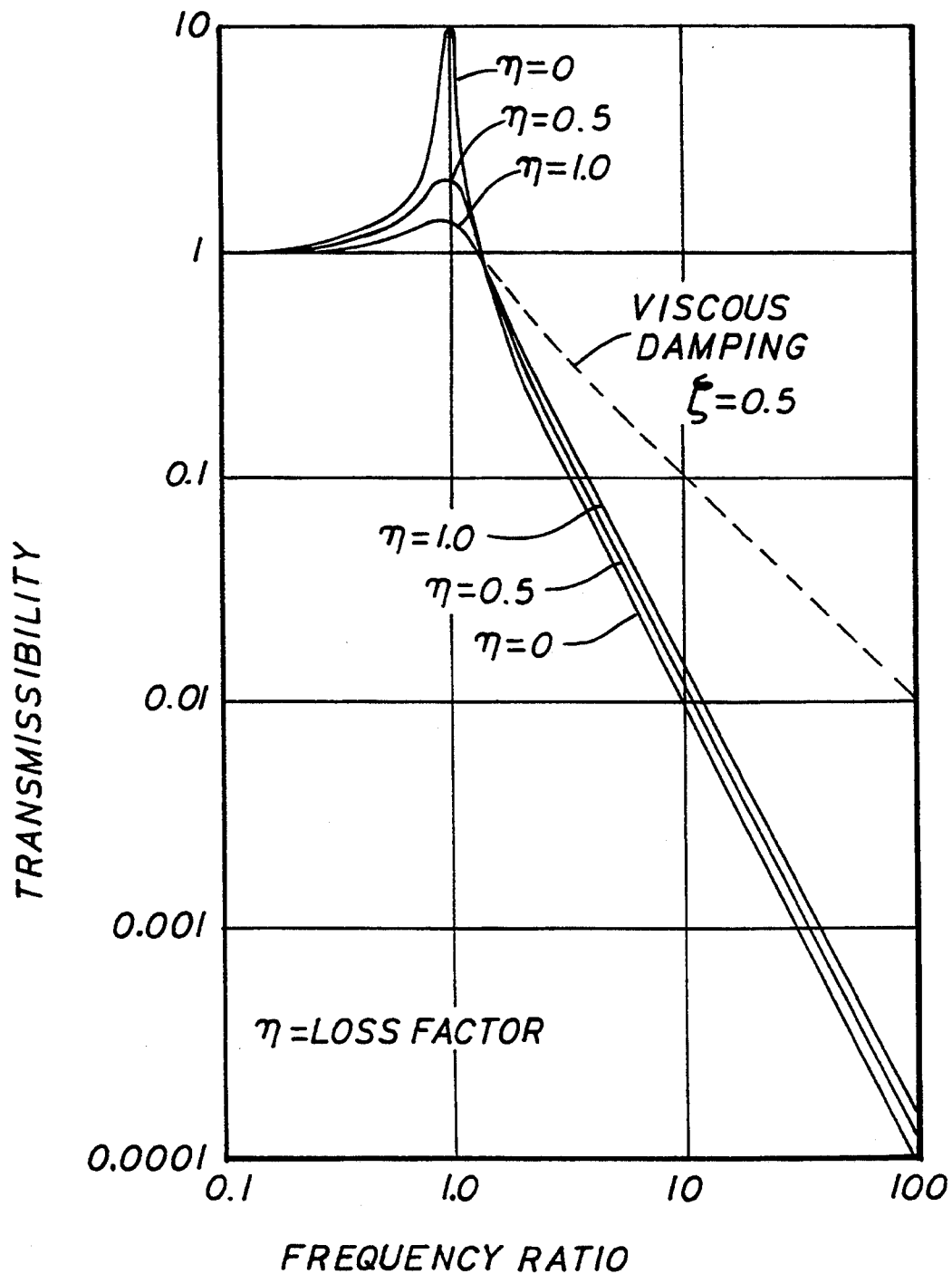
FIG. 12 is a set of transmissibility versus frequency ratio curves for an idealized hysteretically damped vibration isolation system and a curve for a viscously-damped system.

FIGS. 7 through 9 show other embodiments of radial-flexure-damper assemblies with radial loading means in vertical-motion isolators built in accordance with the present invention. Referring initially to FIG. 7, a cross-sectional side view of a vertical-motion isolator showing one of three radial-flexures-damper assemblies with radial loading means is illustrated. This particular radial-flexure-damper assembly 190 comprises a rigid rod 192 that has an end 194 that passes through and is bonded to an annular spring-damper element 196. Likewise, the other end 198 of the rod 192 passes through and is bonded to a second spring damper element 200.

This particular rod 192 is clamped in its radial direction between two springs 202 and 204 in the form of small "bridge bearing" springs which are similar to the ones used in the embodiment shown in FIG. 5 and are comprised of alternating layers of steel and neoprene bonded together to produce a stiff spring in the radial direction and a relatively soft spring in lateral shear. The end of the rod 194 with its spring damper element 196 is housed within an opening 206 located in the central hub 208 of the isolator. This spring damper element 196 is contained between and is bonded to a hollow plug 210 which is threaded into the opening located in the hub. The bridge-bearing spring is likewise disposed in this opening located in the hub to provide a sufficient stiffness as the rod is loaded axially in compression but allows for relatively soft stiffness laterally.

A loading screw 212 engages a threaded portion of a large opening 214 formed in the support post 216. A smaller opening 218 is also defined in this support post 216 for receiving the end of the rod and its annular spring-damper element. The screw is used to radially compress the assembly of the bridge-bearing springs and the rigid rod to thereby load the radial flexure. The rod 192 has spherical ends and is captured in a shallow spherical cavities 220 located in the steel layers of the bridge bearing springs that contact the rod.

The innermost layer 222 of the bridge-bearing spring 202 and the outermost layer 224 of the bridge-bearing spring have larger diameters than the rest of the springs 202 and 204 and serve to center the springs in the holes and allow for lateral shear deformation of the springs. The threaded plug 210 is used to provide a smaller outer diameter than the opening in the hub for the spring damping element. The outer spring-damper element is contained between and bonded to the rod and to the smaller hole located in the support post. The spring-damper elements can be made from a polymeric rubber-like material that has suitable stiffness and can exhibit high damping.

Operation of this particular isolator causes the rod to tilt as its spherical ends rock in the spherical cavities in the bridge-bearing springs, causing some lateral shear deformation of the bridge-bearing springs. This tilt deflection of the rod and lateral shear deformation of the bridge-bearing springs along with the compressive radial load on the rod produces the negative-stiffness effect that counteracts the positive stiffness on the support spring 242, the spring-damper elements and the bridge bearing springs. Deformation of the spring-damper elements produces most of the damping for the isolator. This arrangement permits high values of radial loading on the radial-flexure-damper assembly with little or no steady loading of the spring damper elements, thereby permitting selection of an optimum damping material with little constraint on its stiffness, strength and creep properties. A variation of the embodiment shown in FIG. 7 can use a Belville or coned-disc spring to replace the bridge-bearing-type springs that were utilized in the illustrated embodiment.

FIG. 8 shows another embodiment of a radial flexure-damper assembly 250 which can be used in a vertical-motion isolator built in accordance with the present invention. This particular assembly 250 also utilizes a rigid rod 252 with spherical ends having a first end section 254 and a second end section 256 which are bonded to annular spring damper elements 258 and 260. This particular assembly is similar to the one shown in FIG. 7 except that the opening 262 in the central hub 264 is much smaller and only houses the first end Section with its annular spring-damper element. This particular opening 262 also has a shallow spherical cavity 266 which captures the spherical end of the rod.

The loading screw 268 which is located in the opening 270 formed in the support post block 272 is similar to the one shown in FIG. 7. The support post 272 also has a small opening 274 in which the other end of the rod with its spring-damper element is housed. Similarly, the bridge-spring 276 utilized with the loading screw has a steel plate 278 with a shallow spherical cavity 280 for capturing the other spherical end of the rod. The loading and the operation of this particular assembly is similar to one shown in FIG. 7.

Referring now to FIG. 9, an alternative embodiment of the radial-flexure-damper assembly 290 is shown. This particular assembly 290 is simpler than the ones shown in FIGS. 7 and 8 and includes a rod 292 having one end attached to an annular spring-damper element 294 with the other end similarly bonded or attached to a second spring-damper element 296. The end of the rod with its spring-damper element 294 is housed within an opening 298 located in the central hub 300 of the isolator. The support post 302 has a single opening defined therein for receiving the other end of the rod with its spring-damper element 296. A loading screw 304 is likewise threadedly engaged in this opening and contacts a movable plate 306 which is interplaced between the end of the screw and the end of the spring-damper element. In a similar fashion, the loading screw can be adjusted to apply the desired radial force on the rod 292.

FIG. 10 shows another embodiment of the invention in which multiple-layered beams clamped at their ends are used for radial flexures to add damping to the vertical-motion isolator through mechanical friction. Similar multiple-layered construction with clamped ends can be used to add damping to the column members that form the horizontal-motion isolators as well. FIG. 10 shows a cross-sectional side view of a radial flexure constructed as a multiple-layered beam. The particular flexure 310 includes an inner layer 312 of a structural material such as hardened steel. This inner layer 312 is surrounded by additional layers 314 and 316 of a structural material. Bolts 318 and nuts 320 hold the two piece center hub 322 together and secure the radial flexures at their inner ends 324. Bolts 326 are similarly used to hold together a two piece mounting block 328 together and secure each radial flexure at its outer end 330. Operation of the vertical-motion isolator causes the flexure to deform, thereby causing energy to be dissipated by mechanical friction between the layers of material that form the composite flexure and between the outer layers and the clamping surfaces, thereby creating damping for the system. With this construction, metals or other suitable structural materials can be used to resist severe environments such as high temperatures.

FIG. 11 shows another embodiment of the invention in which bimetallic construction is used in the radial flexures of the vertical-motion isolator to provide the necessary damping. The particular embodiment shown in FIGS. 10 and 11 can be used to protect buildings and equipment from severe ground motions caused by earthquakes. Similar bimetallic construction can be used to add damping to the column members in a horizontal motion isolator as well.

FIG. 11 shows the composite radial flexure 340 which includes an inner high-strength core 342 such as a high-strength steel and outer layers 344 of a low-strength material such as mild steel. The radial flexure 340 is clamped at its inner end 346 to a two-piece center hub 348 and is clamped at its outer end 350 to a two-piece mounting block 352. Bolts 354 or other similar fastening devices clamp the radial flexure and hold the two-piece center hub and mounting block together.

Operation of this vertical-motion isolator in response to severe ground motion from an earthquake, or other severe vibration, deforms the radial flexure in bending causing the outer layers 344 to strain beyond their yield point, thereby dissipating energy through cyclic plastic deformation while the core 342 remains elastic. Although straining the outer layer material beyond its yield point limits the fatigue life of these particular layers, with the damping multiplication effect utilized in accordance with the present invention, the system can be designed for high damping and adequate fatigue life to withstand the strain cycling caused by a "worst case" design earthquake or other severe vibration. If necessary, the bimetallic elements can be replaced if overstrained.

The columns and flexures utilized in the present invention can be made from a number of suitable materials, for example, structural materials such as steel and aluminum alloys, non-metallics and other structural materials that have appropriate elastic and strength properties. It is also possible in some applications to utilize a polymeric rubber-like material column member in the horizontal-motion isolation system, thereby eliminating the need for column members made from steel rods or other structural materials. In such an embodiment, the column member acts as a beam-column to support the weight load and to also provide the reduced horizontal stiffness while also providing damping for the isolator. Similarly, the support spring under the center hub and the radial flexure can also be made from a polymeric rubber-like material having sufficient stiffness and damping to provide the positive and negative stiffness as well as the damping in the vertical-motion isolator.

The present invention can also be used to retrofit existing systems of vibration isolated payloads in order to reduce the stiffness and increase the damping, thereby improving the vibration isolation behavior of the retrofitted system. By using the negative-stiffness mechanisms which have been described as part of this invention, the stiffness of existing systems can be decreased in both the vertical and horizontal directions, thereby lowering the system's resonant frequencies and also increasing the damping inherent in the system. For retrofit to improve vertical-motion behavior, radial flexures and means for applying compressive radial load to the flexures could be connected to the payload. If additional damping is desired, radial-flexure-damper assemblies can be used, or separate vertical damper assemblies can be added between the payload and ground. For retrofit to improve the horizontal-motion behavior, flexible columns or column assemblies could be connected between the payload and ground and loaded beyond their critical buckling loads to provide negative stiffness in horizontal directions, thereby reducing the horizontal stiffness of the system and increasing the damping inherent in the system. If additional damping is desired, column-damper assemblies could be used or separate horizontal damper assemblies could be connected between the payload and ground. An alternative method for retrofitting to improve horizontal-motion behavior would be to use sets of three vertical-motion-type isolators connected between the payload and ground and spaced at 120°, as described in the original co-pending application, so as to impart net negative stiffness in the horizontal directions.

The same retrofit methods can also be used to reduce the stiffness and increase the damping of vibration isolated payloads in which part of the stiffness comes from flexible lines connected between the payload and ground such as power cables and hoses. Reduction in stiffness and increase in damping can be achieved in different magnitudes in the vertical and horizontal directions. Also, where lines connected to payloads introduces varying amounts of stiffness in different horizontal directions, the negative-stiffness effect in the horizontal direction can be tailored to accommodate this varying stiffness by using super-critically-loaded columns that have different buckling strengths for bending about different axes, or different elastic instability points depending on the instability mode shape. An example is use of a flexible column with a square or rectangular cross-section.

While several particular forms of the invention have been illustrated and described, it will be apparent that various modifications can be made without departing from the spirit and scope of the present invention. Accordingly, it is not intended that the invention be limited, except by the attached claims.

What is claimed is:

1. A vibration isolation suspension system for supporting an object having mass in an acceleration field and maintaining the object in an equilibrium position relative to a base while suppressing transmission of vibratory motion between the object and base comprising:

a plurality of elastic structures, each having a first end connected to the object and a second end connected to the base, said first and second ends defining an axial direction, and damping means operative with said elastic structures for providing damping to the system, wherein each of said elastic structures have transverse stiffness in response to displacement of said first end relative to said second end in any direction substantially transverse to the axial direction and stiffness in the axial direction to support the object, each of said elastic structures having a point of elastic instability in response to loading in the axial direction where at the point of elastic instability said elastic structure has zero or near zero transverse stiffness, each of said structures being loaded in the axial direction to approach its point of elastic instability to cause a substantial reduction of its transverse stiffness while maintaining sufficient axial stiffness to support the object.

2. The system as defined in claim 1 wherein said damping means comprises a damping element connected to the object and base.

3. The system as defined in claim 2 wherein said damping element is made from a polymeric material.

4. The system as defined in claim 2 wherein said damping element is made from a material having viscoelastic properties.

5. The system as defined in claim 2 wherein said damping element is made from a material having a loss factor in a range from 30 to 100%.

6. The system as defined in claim 1 wherein said damping means comprise a damping assembly associated with each elastic structure, each assembly including:
- a rigid tubular member surrounding said elastic structure and having a first end and a second end;
- a first damping element attached to said first end of said tubular member;
- a second damping element attached to said second end of said tubular member;
- means for connecting said first end and damping element to the object;
- means for connecting said second damping element to the base.

7. The system as defined in claim 1 wherein said damping means comprise a damping element having axial and transverse stiffness disposed between the object and base but carrying no load in the axial direction.

8. The system as defined in claim 1 wherein said damping means includes a damping element having axial and transverse stiffness disposed between the object and the base and each of said elastic structures is loaded to a point beyond its point of elastic instability to reduce part of the transverse stiffness of said damping element.

9. The system as defined in claim 1 wherein said damping means applies damping to the system hysteretically.

10. The system as defined in claim 1, wherein said damping means comprise:
- a first damping element attached to the first end of each elastic structure;
- a second damping element attached to the second end of each elastic structure;
- means for connecting each of said first damping elements to the object; and
- means for connecting each of said second damping elements to the base.

11. The system as defined in claim 10 wherein said means for connecting each of said first damping element to the object comprises an opening defined in the object which is adapted to receive one of said first damping elements and said means for connecting each of said second damping elements to the base comprises an opening defined in the base which is adapted to receive one of said second damping elements.

12. The system as defined in claim 10, wherein each of said first and second damping elements carry no load in the axial direction.

13. The system as defined in claim 10, wherein each end of said elastic structures is in contact with a spring having alternate layers of metal and rubber-like material affixed together.

14. A method for reducing transmission of vibration between an object and a base comprising the steps of:
- connecting the object to the base on suspension means which exhibits positive stiffness and damping; and
- applying negative stiffness between the object and the base for counteracting the positive stiffness and increasing the damping of the suspension means.

15. A method for reducing transmission of vibration between an object and a base comprising the steps of:
- connecting the object to the base with an elastic structure and a damping element which are operatively connected; and
- applying load to the elastic structure to cause at least a portion of the structure to approach a point of elastic instability.

16. A method for reducing transmission of vibrations between an object and a base comprising the steps of:
- connecting the object to the base with an elastic structure and a damper which are operatively connected; and
- applying load to the elastic structure to cause at least a portion of the structure to be loaded beyond a point of elastic instability.

17. A method for reducing the net stiffness of a vibration isolation system connected between an object and a base in which the object includes a member connected between the object and base which imparts positive stiffness between the object and the base, comprising the steps of:
- connecting the object to the base with an elastic structure; and
- applying load to the elastic structure to cause at least a portion of the structure to approach a point of elastic instability.

18. A method for adding damping to a vibration isolation system connected between an object and a base in which the object includes a member connected between the object and the base which imparts positive stiffness between the object and the base, comprising the steps of:
- connecting the object to the base with an elastic structure; and
- applying load to the elastic structure to cause at least a portion of the structure to approach a point of elastic instability.

19. A vibration isolation suspension system for supporting an object having mass in an acceleration field which defines an axial direction while maintaining the object in an equilibrium position relative to a base and suppressing transmission of vibratory motion between the object and base, comprising:
- an elastic structure having axial stiffness and adapted to receive a compressive loading force, said elastic structure having an end for supporting the object and comprising a multiple-layered flexure having an inner layer made from a structural material surrounded by two outer layers made from structural materials, said inner and outer layers being operatively connected to the object, said elastic structure having a point of elastic instability in response to application of a compressive loading force where at the point of elastic instability said elastic structure has substantially zero axial stiffness, said elastic structure being loaded to approach a point of elastic instability to cause a substantial reduction of its axial stiffness; and
- means for applying a compressive loading force to said elastic structure.

20. The system as defined in claim 19 wherein the inner layer of said multiple-layered flexure is made from a high-strength material and the two outer layers are made from a ductile material having lower strength than the inner layer.

21. The system as defined in claim 19 wherein the inner and outer layers are fastened together using mechanical fastening means.

22. A vibration isolation suspension system for supporting an object having mass in an acceleration field which defines an axial direction while maintaining the object in an equilibrium position relative to a base and suppressing transmission of vibratory motion between the object and base, comprising:

an elastic structure having axial stiffness and adapted to receive a compressive loading force, said elastic structure having an end for supporting the object and a point of elastic instability in response to application of a compressive loading force where at the point of elastic instability said elastic structure has substantially zero axial stiffness, said elastic structure being loaded to approach a point of elastic instability to cause a substantial reduction of its axial stiffness;

means for applying a compressive loading force to said elastic structure; and damping means operative with said elastic structure for providing damping to the system.

23. The system as defined in claim 22, wherein said damping means comprises a damping element having axial and transverse stiffness disposed between the object and base but carrying no load in the axial direction.

24. The system as defined in claim 22, wherein said damping means includes a damping element having axial and transverse stiffness disposed between the object and base and said elastic structure is loaded to a point beyond its point of elastic instability to reduce part of the axial stiffness of said damping element.

25. The system as defined in claim 22, wherein said elastic structure comprises at least two rods, each having a first and second end and said damping means comprises:

a first damping element attached to each of said first ends of said rods;

a second damping element attached to each of said second ends of said rods;

means for connecting each of said first ends of said rods to a central hub for supporting the object; and means for connecting each of said second ends to said means for applying a compressive load.

26. A method for increasing the vibration isolating performance of an existing vibration isolating suspension system which has positive axial stiffness and load supporting capability in an acceleration field defining an axial direction while suppressing at least some vibratory motion having a component in the axial direction between an object and base, comprising the steps of:

operatively connecting a second suspension apparatus having means for producing negative stiffness in the axial direction between the object and base; and applying negative stiffness between the object and base to counteract the positive axial stiffness of the existing vibration isolating suspension system.

* * * * *